United States Patent
Wu et al.

(10) Patent No.: US 6,214,758 B1
(45) Date of Patent: Apr. 10, 2001

(54) METHOD OF MAKING SMALL PORE HYDROPHILIC MOLECULAR SIEVE BODIES

(75) Inventors: Shy-Hsien Wu, Horseheads; Kenneth E. Zaun, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/153,932

(22) Filed: Sep. 16, 1998

Related U.S. Application Data

(60) Provisional application No. 60/061,449, filed on Oct. 8, 1997.

(51) Int. Cl.[7] .................................................. B01J 29/06
(52) U.S. Cl. ................................. 502/64; 502/60; 502/63
(58) Field of Search ................................... 502/60, 63, 64

(56) References Cited

U.S. PATENT DOCUMENTS

| | | |
|---|---|---|
| 4,631,267 | 12/1986 | Lachman et al. . |
| 4,637,995 | 1/1987 | DeAngelis et al. . |
| 4,762,010 | 8/1988 | Borghard et al. . |
| 5,132,260 * | 7/1992 | Plee . |
| 5,492,883 | 2/1996 | Wu . |
| 5,538,681 | 7/1996 | Wu . |
| 5,565,394 | 10/1996 | Lachman et al. . |
| 5,633,217 | 5/1997 | Lynn . |

FOREIGN PATENT DOCUMENTS 0 776 696   6/1997   (EP) .

* cited by examiner

*Primary Examiner*—Tom Dunn
*Assistant Examiner*—Christina Ildebrando
(74) *Attorney, Agent, or Firm*—L. Rita Herzfeld; Anca C. Gheorghiu

(57) ABSTRACT

A small pore hydrophilic molecular sieve body and method of making same involves forming a plasticized mixture of hydrophilic molecular sieve powder having a pore size of no greater than about 5.0 angstroms, temporary binder, silicone resin binder emulsion, and polar vehicle, shaping the mixture into a green monolithic body, and drying and heat-treating the green monolithic body to impart strength to the green body and form the product molecular sieve monolith. The body is made up of about 80% to 95% by weight molecular sieve with the balance being silica binder.

8 Claims, No Drawings

1

METHOD OF MAKING SMALL PORE HYDROPHILIC MOLECULAR SIEVE BODIES

This application claims the benefit of U.S. Provisional Application No. 60/061,449, filed Oct. 8, 1997, entitled "Method of Making Small Pore Hydrophilic Molecular Sieve Bodies", by Shy-Hsien Wu and Kenneth E. Zaun.

This invention relates to a method of making hydrophilic small pore sizes molecular sieve bodies by shaping a plasticized mixture of the molecular sieve and a silicone resin binder that is provided as an emulsion. Use of the silicone resin as an emulsion results in production of a stronger body for a small pore size hydrophilic molecular sieve than if the silicone resin were dissolved in a solvent.

BACKGROUND OF THE INVENTION

Molecular sieve monoliths, such as zeolite monoliths find use in catalytic applications such as catalysts, catalyst supports, or adsorbing structures, where they must be strong and of uniform composition throughout the body. Depending on their pore size, they are suitable for adsorbing various molecular size contaminants or for catalyzing various chemical reactions, or for moisture removal. They are made by shaping e.g. extruding plasticized mixtures of the molecular sieve and various binders and vehicle such as water. One effective binder is silicone resin. Ordinarily the silicone resin is dissolved in a solvent as described in U.S. Pat. Nos. 4,631,267 and 5,633,217. For hydrophobic molecular sieves such as e.g. ZSM zeolites, this poses no problem. However, with hydrophilic molecular sieves, repelling of the silicone resin binder solution poses a problem. For example, in forming a plasticized batch of a hydrophilic zeolite small pore such as A4 zeolite with silicone resin dissolved in a solvent, the batch becomes soft and gummy upon addition of the silicone resin solution prior to addition of the water vehicle. Though rods and ribbons can be extruded, the products are so gummy and soft that it is impossible to maintain their shapes for further processing.

When the monoliths are honeycombs especially honeycombs with thin walls, it is even more important that the plasticized mixture be stiff and able to maintain its shape, otherwise the honeycomb walls will collapse.

U.S. Pat. No. 5,492,883 relates to shaping zeolites using a silicone resin emulsion as a binder. However, the zeolites are medium to large pore size.

It would be desirable to have a method of shaping plasticized mixtures of small pore molecular sieves wherein the shaped products would have strength in both the green state and the final heat-treated structure.

SUMMARY OF THE INVENTION

In accordance with one aspect of the invention, there is provided a method of making a small pore molecular sieve monolithic body that involves forming a plasticized mixture of hydrophilic molecular sieve powder having a pore size of no greater than about 5.0 angstroms, temporary binder, silicone resin binder emulsion, and polar vehicle, shaping the mixture into a green monolithic body, and drying and heat-treating the green monolithic body to impart strength to the green body and form the product molecular sieve monolith.

In accordance with another aspect of this invention, there is provided a small pore hydrophilic molecular sieve monolithic body having a pore size of no greater than about 5.0 angstroms, and made up of about 80% to 95% by weight molecular sieve with the balance being silica binder.

DETAILED DESCRIPTION OF THE INVENTION

This invention provides a method to shape small pore hydrophilic molecular sieves into monolithic bodies of sufficient strength to maintain their shape through handling, drying, and heat-treating operations. The bodies are shaped from a plasticized mixture of the molecular sieve, temporary binder, silicone resin binder emulsion, and polar vehicle which is preferably water.

The Molecular Sieve

This invention is useful for hydrophilic molecular sieves of small pore size. By hydrophilic is meant those having a $SiO_2:Al_2O_3$ mole ratio of no greater than about 30:1, and preferably between about 30:1 to 1:1 and more preferably about 10:1 to 1:1. By small pore size according to this invention is meant pore sizes no greater than about 5.0 angstroms. These molecular sieves find use in specialized adsorption applications and/or where water absorbing capability is desired.

Some suitable molecular sieves that fit this description are A3, A4, A5, ferrierite, erionite, and chabazite. Especially suited are A3, A4, and A5, with A4 being especially preferred.

Temporary Binders

Temporary binders are so called because they are removed during the final heat-treatment. The temporary binders are plasticizing organic binder with optional additions of a co-binder.

The plasticizing Organic Binder

The organic binder contributes to the plasticity of the mixture for shaping into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose, while Methocel F4M, F240, and K75M are hydroxypropyl methylcellulose.

The organic binder content is typically is about 2% to 12% and preferably about 3 to 8 wt. %.

Co-binders

Co-binders can be used to enhance the plasticity of the mixture. Some co-binders that are useful are low molecular weight water-soluble binders such as for example, polyvinyl alcohols such as those available from Air Products, Allentown Pa., under the designation Airvol, e.g. Airvol 205 (molecular weight 31,000–50,000) and Airvol 350 (molecular weight 124,000–186,000). Other useful water soluble binders include polyvinylpyrrolidones such as those available from GAF, Linden, N.J., under the designation PVP K-30 (row 40,000) and PVP K-60 (row 160,000). Airvol 205S is particularly useful. Polyvinyl acetate is also suitable.

The silicone resin binder emulsion

Aqueous silicone resin emulsions such as phenylmethyl silicone resin emulsions available from Dow Corning Corporation, Midland Mich. and sold under the designations 1-0468 and 1-0469 for example are particularly useful for the practice of the invention. These silicone resin emulsions are characterized by about 60 weight percent resin solids that sinter to yield about 52 weight percent silica having a particle size of about 7000 Angstroms, and can contain very small amounts (0.5 to 1 lb/gal of the emulsion) of an organic aromatic solvent.

A homogeneous formable mixture is made of the raw material, permanent binder and/or permanent binder precursors, temporary binder, and vehicle. Although any vehicle can be used that is safe, feasible and does not adversely affect the mixture, the preferred vehicle in extrusion processing is water The water content is typically about 12% to 50 wt. %, and preferably about 28% to 45 wt. %.

The weight percents of the organic components and vehicle are calculated as superadditions with respect to the non-organic solids by the following formula:

$$\frac{\text{weight of organic component,}}{\text{fired weight units of inorganic powder}} \times 100$$
$$\text{(molecular sieve + silica)}$$

Normally, the molecular sieve and silicone resin binder emulsion are provided in amounts sufficient to result in a weight ratio of molecular sieve to silica in the product of about 80:20 to 95:5.

One advantageous mixture composition consists essentially of in percent by weight based on the fired zeolite and silica, about 2% to 12% temporary binder that is methylcellulose and/or methylcellulose derivatives, about 12% to 50% water, sufficient zeolite to result in about 80% to 95% zeolite on a fired basis, and sufficient silicone resin emulsion to result in about 5% to 20% silica on a fired basis.

More advantageously the mixture composition consists essentially of in percent by weight based on the fired zeolite and silica, about 3% to 8% temporary binder that is methylcellulose and/or methylcellulose derivatives, about 28 to 45% water, sufficient zeolite to result in about 83% to 92% 4A zeolite on a fired basis, and sufficient silicone resin emulsion to result in about 17% to 8% silica on a fired basis.

The mixture components are combined to form a homogeneous or substantially homogeneous mixture. Normally the dry ingredients are first dry blended, preferably in an intensive mixer, and then combined with the wet ingredients It is highly desirable that the raw material be well mixed into a plasticized batch with the silicone resin. Conventional mixing equipment, e.g. mix-muller or high shear mixer can be used. To effect further mixing, the batch can be first extruded through a "noodling" die one or more times.

The mixture is formed into any desired shape depending on the application. Some typical shapes can be, for example, pellets, rods, tubes, ribbons, or disks, or multicellular structures such as honeycombs, etc.

The method of this invention is particularly well suited to the preparation of structures in the shape of honeycombs.

Generally honeycomb cell densities range from 235 cells/$cm^2$ (about 1500 cells/$in^2$) to 1 cell/$cm^2$ (about 6 cells/$in^2$). Examples of honeycombs produced by the process of the present invention, although it is to be understood that the invention is not limited to such, are those having about 94 cells/$cm^2$ (about 600 cells/$in^2$), about 62 cells/$cm^2$ (about 400 cells/$in^2$), or about 47 cells/$cm^2$ (about 300 cells/$in^2$), those having about 31 cells/$cm^2$ (about 200 cells/$in^2$), or those having about 15 cells/$cm^2$ (about 100 cells/$in^2$).

Cell wall thicknesses range from about 0.1 to about 1.5 mm.

The resulting shaped green bodies are dried first to remove the vehicle. This can be done by steam or controlled humidity drying, dielectric drying of combinations of these techniques.

For example one suitable drying technique is use of a dielectric dryer at low power or short drying times, followed by conventional oven or air drying. Dielectric drying is known in the art. Those skilled in the art can adjust the dielectric dryer in known ways to obtain low power drying, such as adjusting plate height, adjusting RF voltage, or adjusting drying time. This is especially suited for honeycomb structures.

Another suitable drying technique is a relative humidity drying technique. This is especially suitable for rods or bodies having thicker cross sections than for example, honeycombs. One especially preferred relative humidity drying technique is carried out according to the following schedule:

| Temp (° C.) | Relative Humidity (%) | Time (hrs) |
|---|---|---|
| 1. from 30 to 60 | 95 | in 10 |
| 2. hold at 60 | 95 | for 48 |
| 3. hold at 60 | 95–50 | in 30 |
| 4. drop from 60 to 30 | 50 | in 12 |
| | Total hours | 108 |

The dried bodies are heated (fired) at a temperature of about 400° C. to 850° C. to develop strength. The heating temperatures depend on the particular support material. For example, for a zeolite the temperatures are most advantageously about 500° C. to 750° C. The heating times depend on factors such as the type of material, temperature, size and shape of the body, etc.

According to the present invention, stiff batches are obtained for small pore hydrophilic molecular sieves enabling them to be shaped such as by extrusion into cohesive green bodies that can be handled without deformation and dried and heat-treated to produce high strength bodies.

The hydrophilic small pore molecular sieve bodies of the present invention consist essentially of in percent by weight about 80% to 95% molecular sieve, with the balance being silica binder.

It has been found that rods made of about 83–87 wt. % zeolite with the balance being silica, have an MOR of at least about 2000. An example of such rods are those having about 85% 4A zeolite and the balance silica.

It has been found that honeycombs made of about 83–87 wt. % 4A zeolite with the balance being silica, having about 62 cells/$cm^2$ (about 400 cells/$in^2$) and 0.17 mm thick walls or webs, have a crush strength of about 770 psi.

To more fully illustrate the invention, the following non-limiting examples are presented. All parts, portions, and percentages are on a weight basis unless otherwise stated.

COMPARATIVE EXAMPLE 1

The following example illustrates that a small pore hydrophilic zeolite cannot be satisfactorily made using silicone resin dissolved in a solvent as opposed to being in emulsion form.

A plasticized batch or mixture is made up to contain about 400 g of 4A zeolite from Union Carbide, about 50 g of Methocel A4M, (this is about 10% based on fired zeolite/silica mass) about 290.7 g of silicone resin solution (Dow Corning 6-2230 dissolved in dibasic ester solvent in a 3/1 ratio), to yield a composition of about 80% zeolite/20% silica after firing. In most cases water is needed to fully plasticize the Methocel binder for a proper extrusion. This batch immediately became soft, mushy, and gummy upon addition of the silicone resin solution prior to any water addition. Although rods 0.79 cm (⁵⁄₁₆") in diameter and ribbons about 0.96 mm thick can be extruded, the products are so gummy and soft that it is impossible to keep their shapes for further processing.

COMPARATIVE EXAMPLE 2

The presence of up to about 20% bentonite clay (Bentolite L from Southern Clay Products) permits some minor amount of water (about 6%). However, fired rod samples for MOR are very weak. When bentonite clay is present at a level of less than about 20% with decreasing water levels, e.g. about 10% bentonite clay with 0% water, and about 15% bentonite clay with 2% water, rod samples are not only weaker but also nonuniform in cross section. An attempt to extrude a honeycomb from the 15% clay 2% water batch failed due to the product being too soft for a cellular structure to be maintained.

INVENTIVE EXAMPLE 1

A batch was made up to contain about 360 g of 4A zeolite, about 24 g of A4 Methocel (6%), about 128.2 g of silicone resin emulsion 1-0469 to yield a composition of about 90% zeolite and about 10% silica after firing. After the addition of about 42.8% water in a muller, the well-plasticized batch was extruded into rods of about 0.79 cm (⁵⁄₁₆") diameter, ribbons 3.2 cm (1¼") wide and about 0.96–1.44 mm (40 and 60 mils respectively) thick, and a honeycomb having about 62 cells/cm², 0.17 mm wall thickness, 2.54 cm diameter, (400 cells/in², 7 mil wall thickness, 1" diameter). The ribbons are further cut to yield disks of about 2.06 cm (¹³⁄₁₆") in diameter. After drying and firing at about 600° C. for about 10 hours in air at a heating rate of about 25° C./hr, rod samples had an MOR of about 986 psi. The products were homogeneous and strong.

INVENTIVE EXAMPLE 2

A batch was made up to contain about 680 g A4 zeolite, about 48 g A4M Methocel (about 6%), and about 384.6 g of 1-0469 silicone resin emulsion to yield a composition of about 85% zeolite and about 15% silica after firing. After the addition of about 31.7% water in a muller, the well-plasticized batch yields uniform extruded rods, ribbons/disks, and honeycombs as in Inventive Example 1. After drying in a relative humidity controlled oven for about 4 days for the rods (according to the relative humidity control drying technique previously described), for about 95° C./4 days for the ribbons/disks/honeycombs or dielectric oven about 15 minutes for disks/honeycombs, the disks can be fired perfectly at about 600° C./10 hrs/air at a heating rate of about 25° C./hr. The rods can also be readily fired under the same conditions with about 10–20° C./hr heating rates to yield MOR of about 2031 psi for the 10° C./hr rate. This is a very strong zeolite. For honeycombs, a more gentle firing schedule is needed to avoid cracking: 600° C./nitrogen/15 hr, followed by 500° C./air/5 hr all at heating rate of about 10° C./hr to yield a crush strength of about 770 psi. Scanning electron microscope (SEM) and x-ray diffraction analyses show uniform structure and distinct A4 zeolite characteristics.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making a small-pore hydrophilic zeolite molecular sieve body, the method comprising:

a) forming a plasticized mixture consisting of hydrophilic zeolite powder selected from the group consisting of 3A zeolite, 4A zeolite, and 5A zeolite, and having a pore size of no greater than about 5.0 angstroms, temporary binder, aqueous silicone resin binder emulsion, and polar vehicle;

b) shaping the plasticized mixture into a green monolithic body;

c) drying the green body;

d) heat-treating the green monolithic body to impart strength to the green body and form the product zeolite molecular sieve body.

2. A method of claim 1 wherein the zeolite is 4A.

3. A method of claim 1 wherein the temporary binder is a cellulose ether binder selected from the group consisting of methylcellulose, methylcellulose derivatives, and combinations thereof.

4. A hydrophilic zeolite molecular sieve produced according to the method of claim 1 having a pore size of no greater than about 5.0 angstroms, and consisting essentially of in percent by weight about 80% to 95% zeolite, with the balance being a silica binder.

5. A molecular sieve of claim 4 wherein the molecular sieve is 4A zeolite.

6. A molecular sieve of claim 4 wherein the molecular sieve is in the shape of a honeycomb.

7. A molecular sieve of claim 4 wherein the molecular sieve is a rod consisting essentially of in percent by weight about 85% 4A zeolite with the balance being silica, and having an MOR of at least about 2000 PSI.

8. A molecular sieve of claim 4 wherein the molecular sieve is a honeycomb structure consisting of in weight percent by weight about 83% to 87% 4A zeolite with the balance being silica, said honeycomb structure having about 62 cells/cm², and wall thickness of about 0.17 mm, having a crush strength of about 770 psi.

* * * * *